(12) United States Patent
Ilan

(10) Patent No.: US 11,991,290 B2
(45) Date of Patent: May 21, 2024

(54) ASSOCIATIVE HASH TREE

(71) Applicant: GSI Technology Inc., Sunnyvale, CA (US)

(72) Inventor: Dan Ilan, Herzliya (IL)

(73) Assignee: GSI Technology Inc., Sunnyvale, CA (US)

( * ) Notice: Subject to any disclaimer, the term of this patent is extended or adjusted under 35 U.S.C. 154(b) by 205 days.

(21) Appl. No.: 17/665,610

(22) Filed: Feb. 7, 2022

(65) Prior Publication Data

US 2022/0345315 A1     Oct. 27, 2022

Related U.S. Application Data

(60) Provisional application No. 63/304,726, filed on Jan. 31, 2022, provisional application No. 63/176,901, filed on Apr. 20, 2021.

(51) Int. Cl.
    *H04L 9/32*        (2006.01)
    *H04L 9/06*        (2006.01)

(52) U.S. Cl.
    CPC .......... *H04L 9/3239* (2013.01); *H04L 9/0643* (2013.01)

(58) Field of Classification Search
    CPC .............................. H04L 9/3239; H04L 9/0643
    See application file for complete search history.

(56) References Cited

U.S. PATENT DOCUMENTS 6,434,662 B1 *   8/2002   Greene ............... G06F 16/9014
                                                 711/216
6,658,625 B1 *   12/2003   Allen .................... G06F 16/258
                                                 715/236

OTHER PUBLICATIONS

Prithula Dhungel et al., "Pollution in P2P Live Video Streaming", International Journal of Computer Networks & Communications (IJCNC), vol. 1, No. 2, Jul. 2009.

* cited by examiner

*Primary Examiner* — Brian F Shaw
(74) *Attorney, Agent, or Firm* — HEIDI BRUN ASSOCIATES LTD.

(57) ABSTRACT

A system to dynamically calculate a root hash value from a plurality of leaf hash values includes a flat associative memory and a hash parser. The flat associative memory stores a plurality of leaf hash values. The hash parser extracts a compressed number of branch nodes from the plurality of leaf hash values, determines branch node relationships from the plurality of leaf hash values, and saves the compressed number of branch nodes, and the branch node relationships.

21 Claims, 9 Drawing Sheets

NODE DEPTH 0

| NODE KEY/ NUMBER | CHILD NODE KEYS | NODE HASH VALUE |
|---|---|---|
| $RH_A$ | 0, 1 | $RH=H(H(0)|H(1))$ |

TABLE 7A

NODE DEPTH 1

| NODE KEY/ NUMBER | CHILD NODE KEYS | NODE HASH VALUE |
|---|---|---|
| 1 | 12, 111230, 131021 | $H(1)=H(H(12)|111230|131021)$ |
| 0 | 041, 031022 | $H(0)=H(H(041)|031022)$ |

TABLE 7B

NODE DEPTH 2

| NODE KEY/ NUMBER | CHILD NODE KEYS | NODE HASH VALUE |
|---|---|---|
| 12 | 121211, 122102 | $H(12)=H(121211|122102)$ |
| 041 | 0413, 041101 | $H(041)=H(H(0413)|041101)$ |

TABLE 7C

NODE DEPTH 3

| NODE KEY/ NUMBER | CHILD NODE KEYS | NODE HASH VALUE |
|---|---|---|
| 0413 | 041302, 041321 | $H(0413)=H(041302|041321)$ |

TABLE 7D

FIG. 7

NODE DEPTH 0

| NODE KEY/ NUMBER | CHILD NODE KEYS | NODE HASH VALUE |
|---|---|---|
| $RH_A'$ | 0, 1 | $\underline{RH=H(H(0)|H(1'))}$ |

TABLE 7A'

NODE DEPTH 1

| NODE KEY/ NUMBER | CHILD NODE KEYS | NODE HASH VALUE |
|---|---|---|
| 1' | 12, 111230, ~~131021~~ | $\underline{H(1)=H(H(12')|111230)}$ |
| 0 | 041, 031022 | $H(0)=H(H(041)|031022)$ |

TABLE 7B'

NODE DEPTH 2

| NODE KEY/ NUMBER | CHILD NODE KEYS | NODE HASH VALUE |
|---|---|---|
| 12' | ~~121211~~, <u>12121</u>, 122102 | $\underline{H(12)=H(H(12121)|122102))}$ |
| 041 | 0413, 041101 | $H(041)=H(H(0413)|041101)$ |

TABLE 7C'

NODE DEPTH 3

| NODE KEY/ NUMBER | CHILD NODE KEYS | NODE HASH VALUE |
|---|---|---|
| 0413 | 041302, 041321 | $H(0413)=H(041302|041321)$ |
| <u>12121</u> | <u>121210, 121211'</u> | $\underline{H(12121)=H(121210|121211'))}$ |

TABLE 7D'

FIG. 10

ASSOCIATIVE HASH TREE

CROSS REFERENCE TO RELATED APPLICATIONS

This application claims priority from U.S. provisional patent applications 63/176,901, filed Apr. 20, 2021, and 63/304,726, filed Jan. 31, 2022, both of which are incorporated herein by reference.

FIELD OF THE INVENTION

The present invention relates to data verification generally and to hash trees in particular.

BACKGROUND OF THE INVENTION

A hash function converts a variable length data input to a fixed length data output. The input string is often called the message and is converted using an algorithm that deterministically maps the input data to an output, known as a hash value, a hash, a digest, or a state.

A hashing algorithm has 5 key characteristics:
(a) It is deterministic, which means that the same input message always produces the same output hash.
(b) The hash value is quick to compute.
(c) It's a one-way process such that it is unfeasible to generate the input message from a hash value.
(d) It is collision resistant, which means that with very high probability, two different messages won't produce the same hash value.
(e) A small change to a data block should produce a large change to the hash value, which is known as the avalanche effect.

In the unlikely event that two different inputs map to the same hash output, or 'collide,' there are applicative methods to resolve the collisions, e.g. as in hash lookup tables.

An example of a cryptographic hash function, one that is known to be secure and collision resistant, is the SHA-2 family. A specific example of SHA-2, which is often used, is SHA-256 which outputs hash values of 256 bits or 32 bytes in length.

Hashing is used in many applications: in data storage and retrieval, where the hash is used as an index to a data block in a hash data table or memory location; in encryption, as explained hereinabove; and in data verification, where the hash is used as a fingerprint that is used to verify the contents of a data block. By reproducing the hash fingerprint from a block of data, any change to the data will produce a change to the hash value. When the integrity of a data block needs to be established, the hash value may be calculated locally and tested against a hash value stored remotely with the data.

Hash trees perform data verification for multiple data blocks simultaneously. Individual data block hashes are represented as leaves on a tree which are connected to the tree root via a series of nodes and branches. By performing iterative calculations from the leaves up to the root, a single hash value, called the 'root hash,' can be calculated. The root hash is like a single fingerprint for all data blocks in the tree as a group.

Hash Tree Structure & Calculation

A well-known and commonly used implementation of hash trees is a Merkle tree, shown in FIG. 1, to which reference is now made. Merkle tree 10 is a binary hash tree. It has a root 11 at the top, leaves 12 at the bottom, and branch nodes 13 between root 11 and leaves 12. Each leaf 12 has a leaf number LA and a hash value HA, where A is the leaf number. A leaf value represents the hash of a data block 14. For example, data block 1 notated as DB1, is hashed and the hash value H1 is assigned to leaf L1. The positioning of leaves in a hash tree is itself deterministic, but will not be discussed further. In this example, calculations are performed from the bottom level 1 to the top level 4 (from leaves 12 to root 11). In tree 10 there are: 4 levels—Level 1 thru Level 4; 8 leaves, numbered L1 to L8; and there are 8 output hash states H1 thru H8 which are mapped onto leaves L1 to L8 which are on level 1.

Hash states H1 through H8 and are calculated according to equation 1.

$$HA = h(DBA) \qquad (1)$$

where h represents the hash function, and A=1 thru 8. DBA represents the data in data block A; and HA represents the hashed value of DBA that is associated with leaf LA. All calculations are stored in memory.

Similar to leaves 12, nodes 13 have a node number node B, and an associated hash value HB. HB represents calculations performed on child leaves or child nodes. For example, H3A (the hash value of node 3A) is calculated as the hash of H2A (the hash value of node 2A) and H2B (the hash value of node 2B). The calculation is explained hereinbelow.

It should be noted that Merkle trees use a bifurcated node structure, where each node only splits into a maximum of 2 child nodes. Therefore, as more leaves are added to a Merkle tree, more nodes and levels may need to be added. Other implementations of hash trees, and adaptations of Merkle trees, may have different characteristics.

For example, each pair of leaves on level 1 is connected to a node on level 2. Hash values for all level 2 nodes; H2A, H2B, H2C and H2D, are calculated for each node; 2A, 2B, 2C and 2D respectively, as a hash of the concatenated leaf hashes for each node, as shown in equation 2.

$$HP = h(HQ \| HR) \qquad (2)$$

where P is the node number; Q and R are the leaf numbers of the leaves attached to node P; HQ is the hash of data block Q associated with leaf Q, and HR is the hash of data block R associated with leaf R.

Equation 2 can be used to calculate any node with child leaf nodes: H2A is calculated using hashes H1 and H2; H2B is calculated using hashes H3 and H4; etc. All hashes H1 to H8 are retrieved from memory and any new calculations are stored in memory.

For hash tree 10, pairs of level 2 nodes connect to a level 3 node, and a pair of level 3 nodes connect to root 11 on level 4. The hash value RH of root 11 is known as the root hash. Hash values are calculated for all level 3 nodes: node 3A and node 3B, as a hash of the concatenated level 2 node hashes, recalled from memory. Root hash value RH is calculated as a hash of the concatenated level 3 node hashes, also recalled from memory, as shown in equation 3.

$$HS = h(HP_1 \| HP_2) \qquad (3)$$

where S is the node number; $P_1$ and $P_2$ are the node numbers of the child nodes attached to node S; and $HP_1$ and $HP_2$ are the hash values of $P_1$ and $P_2$ respectively, calculated previously and stored in memory.

Equation 3 can be used to calculate any node with child nodes: H3A is calculated using hashes H2A and H2B; H3B is calculated using hashes H2C and H2D, and RH is calculated using hashes H3A and H3B. Hashes H2A, H2B, H2C, H2D, H3A and H3B are retrieved from memory. In the above example, Merkle tree 10 is 'dense,' meaning that all leaf hash values are present on level 1. Leaves L1 to L8 representing all possible output hashes from the hash function are present, as shown in FIG. 1. It should be noted that the positioning of leaves in a Merkle tree is deterministic, which means that the same output hash is assigned to the same leaf.

Sparse Hash Trees

Sometimes, only some of the output hash values are present as leaves, resulting in a 'sparse' tree. Reference is now made to FIG. 2 which represents a sparse Merkle tree 20, which has only 4 leaves of the possible 8 present—L1, L2, L6 and L7. Similarly to dense Merkle tree 10, root node 11 of sparse Merkle tree 20 is calculated from the bottom level 1 to the top level 4.

However, in a sparse Merkle tree, missing leaves and missing nodes that are required to calculate the root hash, RH, are substituted with hash H0, which is the hash value of a data block of all zeroes. Reference is now made to FIG. 3 which shows sparse Merkle tree 20, with required substitute leaves L5 and L8, and required substitute node 2B added for the purposes of the RH calculation. Added leaves and nodes have been shaded for clarity. Calculations are performed as described hereinabove.

As mentioned hereinabove, Merkle trees and hash trees in general can be used to verify transmitted data blocks. This is achieved by sharing part or all of the hash tree, in order that the tree or part of the tree can be recalculated locally to verify hash values. More about the verification process can be found in article "The Pollution Attack in P2P Live Video Streaming: Measurement Results and Defenses" by Dhungel et Al, Polytechnic University, Brooklyn, NY, USA.

Hash Tree Updates

As mentioned previously, the deterministic nature of Merkle trees means that if a data block is deleted, the leaf representing the deleted hash value is also deleted from the tree. Likewise, if a new data block is added, then a new leaf that represents the new data block hash value is added to the tree. Reference is now made to FIG. 4 which illustrates a sparse Merkle tree 30 in which data block DB6 has been deleted and data block DB3 has been added.

Since tree 30 in the example is a sparse tree, substitute leaves and nodes will need to be added and deleted, in order to recalculate root hash RH. Any nodes on the path from either the deleted leaf (L6) to root 11, shown by arrow 17, or from the added leaf (L3') to root 11, shown by arrow 18 will require recalculation. However, any nodes that are not on these paths, do not need recalculation, and their values can be recalled from memory.

The recalculation is performed in 6 steps as follows.

Step 1—calculate H3' by hashing DB3' as in equation 1.

Step 2—(as H2B' now has a leaf, the previous hash value H0 is no longer valid) calculate H2B' by hashing the concatenation of H3' (the hash of newly added leaf L3') and H0 (the hash value of newly required substitute leaf L4') as in equation 2.

Step 3—calculate H3A' by hashing the concatenation of H2A (as it is not on a path from a changed leaf to the root it does not need to be recalculated, and it can be retrieved from memory) and H2B' (from step 2) as in equation 3.

Step 4—Substitute H0 for H2C' (as H2C' now has no leaves—as L6 was deleted and substitute leaf L5 with a hash value of H0 is no longer required).

Step 5—calculate H3B' by hashing the concatenation of H0 (from step 4) and $H_2D$ (from memory, as not on a changed path) as in equation 3.

Step 6—calculate RH' by hashing the concatenation of H3A' (from step 3) and H3B' (from step 5) as in equation 3.

As can be seen, a change in a single data block results in multiple recalculations at multiple levels of tree 30 to calculate RH'.

SUMMARY OF THE PRESENT INVENTION

There is therefore provided, in accordance with a preferred embodiment of the present invention, a system to dynamically calculate a root hash value from a plurality of leaf hash values. The system includes a flat associative memory and a hash parser. The flat associative memory stores the plurality of leaf hash values, and the hash parser extracts a compressed number of branch nodes from the plurality of leaf hash values, determines branch node relationships from the plurality of leaf hash values, and saves the compressed number of branch nodes and the branch node relationships.

Moreover, in accordance with a preferred embodiment of the present invention, the plurality of leaf hash values is stored in columns of the flat associative memory.

Further, in accordance with a preferred embodiment of the present invention, the hash parser extracts the compressed number of branch nodes, and determines the branch node relationships from a top root node down to a set of leaves.

Additionally, in accordance with a preferred embodiment of the present invention, the hash parser parses the plurality of leaf hash values from a most significant byte to a least significant byte of the plurality of leaf hash values.

Further, in accordance with a preferred embodiment of the present invention, the hash parser finds common prefixes between the plurality of leaf hash values.

Still further, in accordance with a preferred embodiment of the present invention, the system includes a node calculator that calculates branch node hash values, and the root hash value according to the branch node relationships Moreover, in accordance with a preferred embodiment of the present invention, the system includes at least one flat node table that saves the compressed number of branch nodes, and the branch node relationships.

Further, in accordance with a preferred embodiment of the present invention, the at least one flat node table records the branch node hash values and the root hash value.

Additionally, in accordance with a preferred embodiment of the present invention, the node calculator recalculates a new root hash value using at least one newly calculated branch node hash value and the branch node hash values stored in the at least one flat node table.

Still further, in accordance with a preferred embodiment of the present invention, the hash parser is implemented in an associative processing unit.

Moreover, in accordance with a preferred embodiment of the present invention, the at least one node table is implemented in CPU memory.

Additionally, in accordance with a preferred embodiment of the present invention, the node calculator is implemented on a CPU.

There is therefore provided, in accordance with a preferred embodiment of the present invention, a method to dynamically calculate a root hash value from a plurality of leaf hash values. The method includes storing the plurality of leaf hash values in a flat associative memory, extracting a compressed number of branch nodes from the plurality of leaf hash values, determining branch node relationships from the plurality of leaf hash values, and saving the compressed number of branch nodes, and the branch node relationships.

Further, in accordance with a preferred embodiment of the present invention, the storing includes storing the plurality of leaf hash values in columns of the flat associative memory.

Additionally, in accordance with a preferred embodiment of the present invention, the extracting and determining are performed from a top root node down to a set of leaves.

Further, in accordance with a preferred embodiment of the present invention, the extracting is performed from a most significant byte to a least significant byte of said plurality of leaf hash values.

Still further, in accordance with a preferred embodiment of the present invention, the extracting finds common prefixes between a plurality of leaf hash values.

Moreover, in accordance with a preferred embodiment of the present invention, the method includes calculating branch node hash values and the root hash value according to the branch node relationships.

Additionally, in accordance with a preferred embodiment of the present invention, the saving includes saving to at least one flat node table.

Further, in accordance with a preferred embodiment of the present invention, the method includes recording the branch node hash values, and the root hash value to the at least one flat node table.

Still further, in accordance with a preferred embodiment of the present invention, the method includes recalculating a new root hash value using at least one newly calculated branch node hash value and the branch node hash values stored in the at least one flat node table.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 7 is a tabular illustration of node tables 7A to 7D, derived from the hash values in FIG. 5A;

FIG. 10 is a tabular illustration of node tables, updated with data derived from hash values in FIG. 8.

Figure 1:
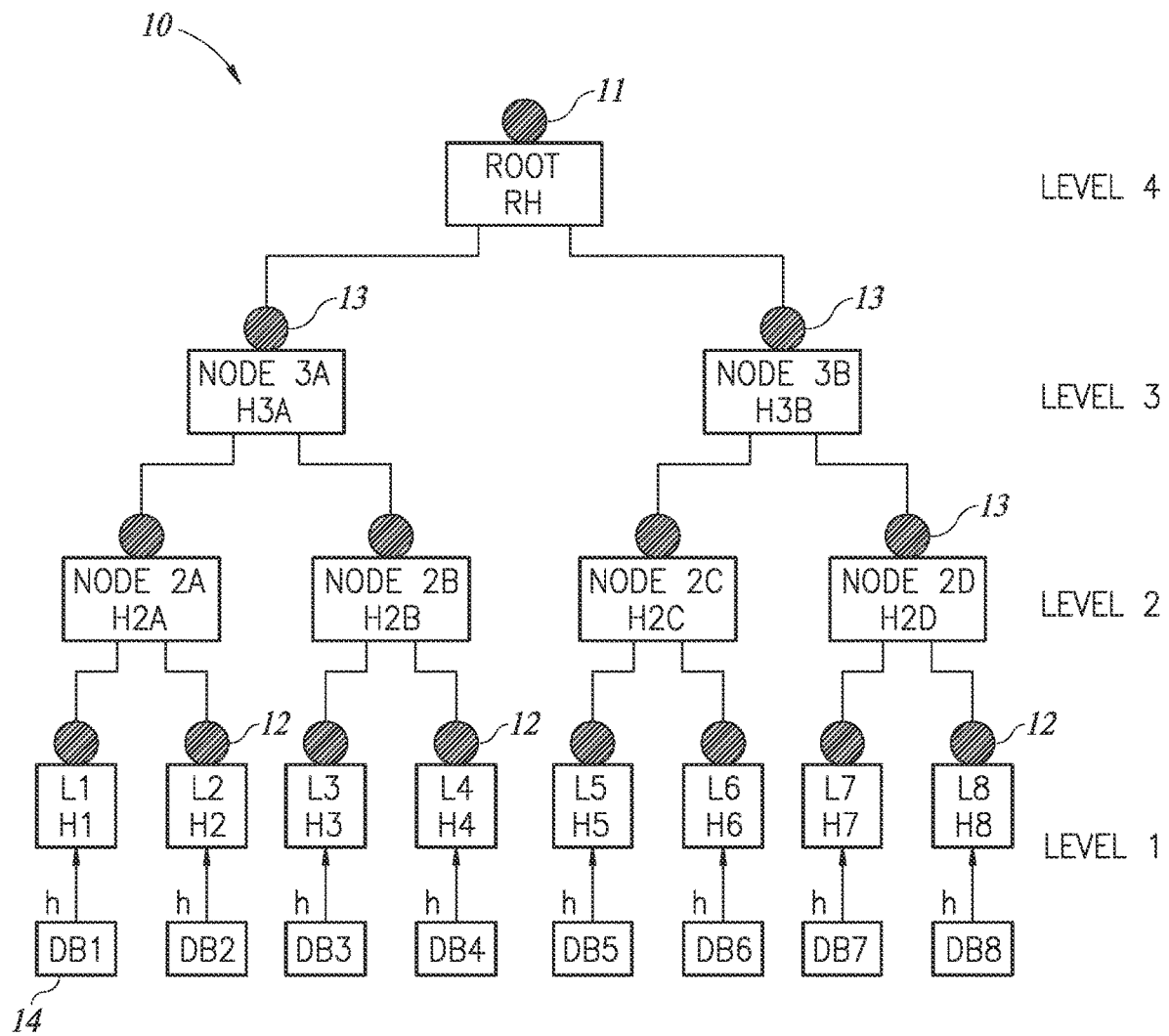
FIG. 1 is an illustration of a dense Merkle tree.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Associative Hash Trees

Applicant has realized that a hash tree structure (i.e. the hierarchical arrangement of nodes and leaves) doesn't need to be stored and recalled from memory and can be dynamically constructed on-the-fly.

Applicant has realized that such a hash tree can be dynamically constructed in a datacentric manner, from a set of data hashes.

Applicant has also realized that hash trees may be dynamically constructed on-the-fly by simultaneously parsing the leaf hash values on a byte-by-byte basis, from the most significant byte (MSB) to the least significant byte (LSB), to produce the branch nodes that connect the root node to the leaf nodes.

Store Leaf Hashes

Figure 5A:
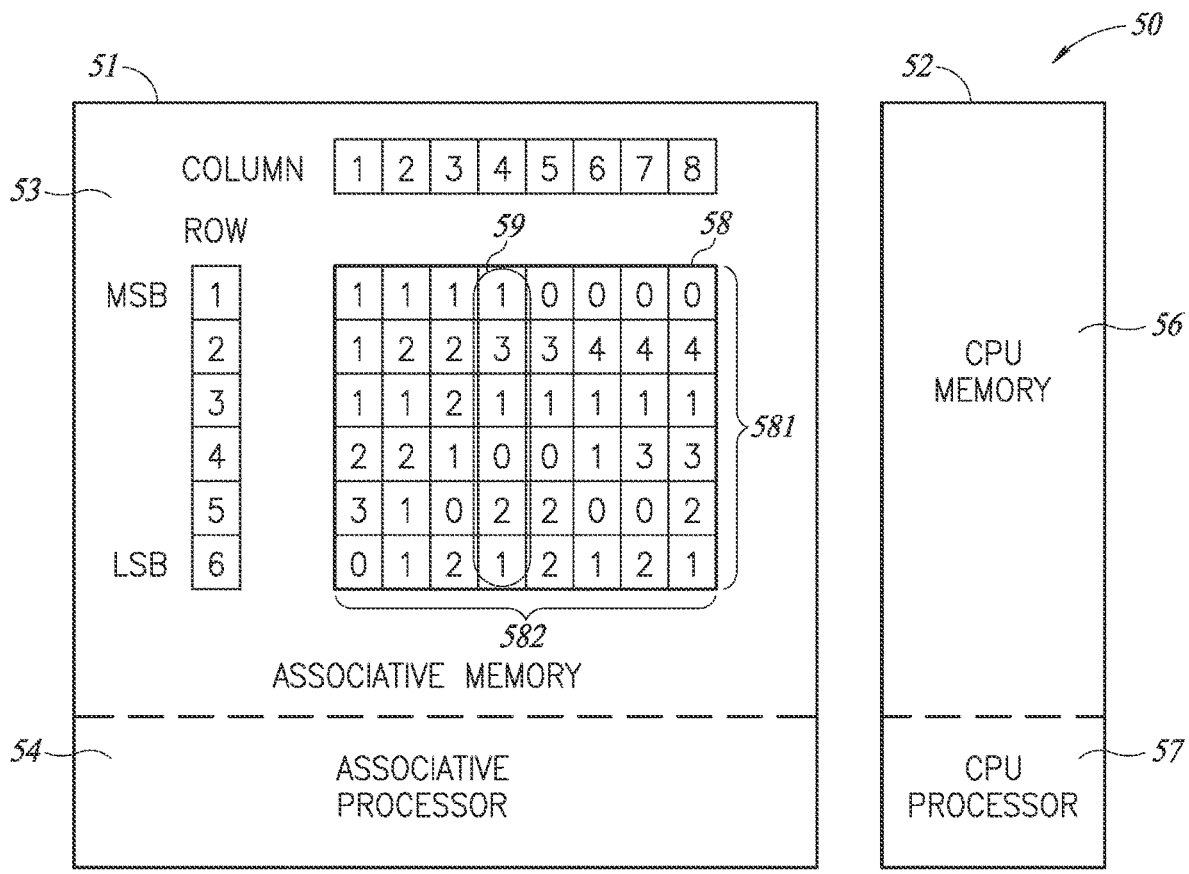
FIG. 5A is an illustration of associative hash tree system, constructed and operative according to a preferred embodiment of the present invention.

Reference is now made to FIG. 5A which illustrates an exemplary associative hash tree system 50 comprising an associative processing unit (APU) 51, and a CPU 52. APU 51 further comprises an associative memory 53 and an associative processor 54. APU 51 may be any suitable associative processing unit, such as the Gemini APU, commercially available from GSI Technology Inc. of the USA. CPU 52 comprises a CPU memory 56 and a CPU processor 57. CPU 52 may be implemented on any traditional computer memory and processor. Associative memory 53 comprises a hash value store 58 which may be a memory array having rows 581 and columns 582 and, in accordance with a preferred embodiment of the present invention, may store hash values 59 in columns 582. In exemplary FIG. 5A, hash value store 58 is shown storing eight 6-byte hash values 59 in columns 582. Each of the six bytes of hash 59 is stored in a separate row 581, the MSB of each hash may be at the top of a column (in the 1st row) and the LSB may be at the bottom of a column (in the $6^{th}$ row). Associative processor 54, CPU memory 56 and CPU processor 57 will be explained further hereinbelow.

The abovementioned branch nodes, or nodes may have a 'node number,' also called a 'key.' Additionally, each node also has a value, which is the hash value associated with the key. Examples of node numbers may be 0, 02, 041, 0413, 03102. In leaf nodes, the node number may be identical to the hash value (the hash value is the same as the key) for example, 011230.

Parse Leaf Hashes

Applicant has realized that a method to determine the structure of a dynamic hash tree from scratch in run-time from a set of leaf hashes may use a recursive, depth-first, back-tracking parsing and compression (RDBPC) algorithm, that is explained hereinbelow.

Applicant has also realized that the method to build a dynamic hash tree, dynamically compresses the tree during parsing. In Merkle trees mentioned hereinabove, the depth of each leaf is fixed and proportional to (log(hash length)). In associative hash trees, the depth of each leaf can be made shorter because of compression methods used in dynamic hash trees.

Figure 5B:
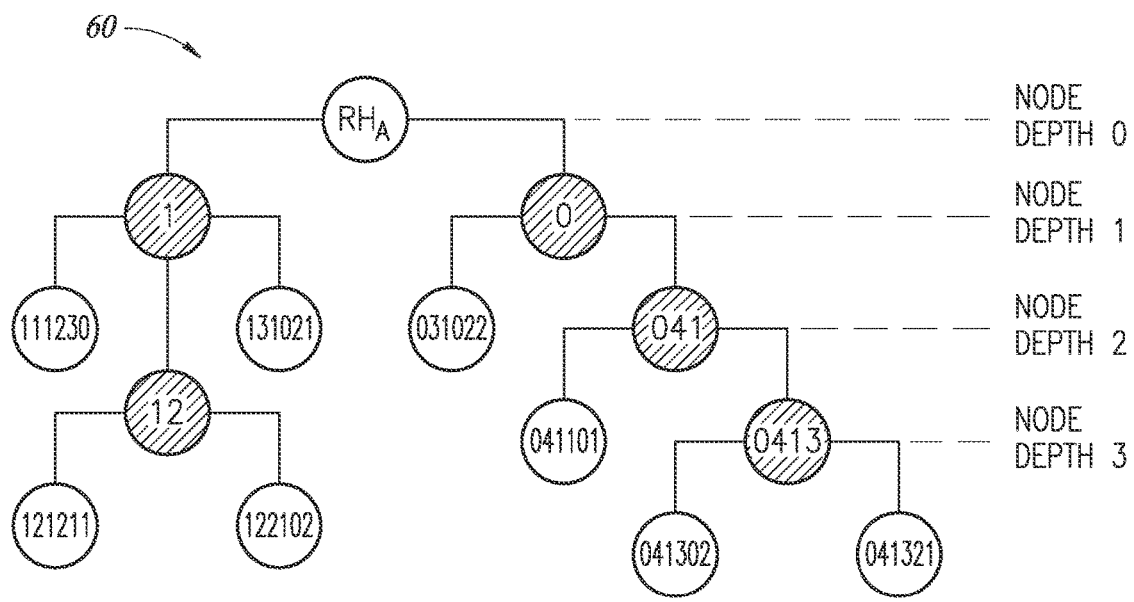
FIG. 5B is an illustration of a sparse associative hash tree derived from the hash values in FIG. 5A.

The RDBPC algorithm may start by parsing all columns simultaneously from row 1 down, to identify the branch node and leaf node structure coming from the root node. These subtrees and nodes may be identified by finding the longest common prefixes across the 8 leaf hashes simultaneously. Reference is made to FIG. 5B which illustrates the final representation of dynamic hash tree 60 created by parsing the 8 leaf hashes 59 in hash value store 58 shown in FIG. 5A.

As mentioned hereinabove, parsing is simultaneous across all columns and starts from the root node and proceeds down into row 1. Row 1 contains byte values of 0 and 1, so there is no single longest common prefix, or value, across the 8 leaf hashes in row 1. The 2 values indicate that the root node branches into two more branches—branch 1 and branch 0. Further parsing may be required for the two branches.

Next, parsing down branch 1 into row 2 (we could have started with branch 0, it makes no difference), reveals byte values 1, 2 and 3 in row 2—which indicates that branch 1 itself branches into three branches in row 2. The presence of such branches indicates that row 1 contains a node, with a node number 1. As this is the first node after the root, it may be described as a branch node with a depth of 1, as shown in FIG. 5B.

When parsing down more than one branch, from one row to the next, if another branch is not encountered, then these branches share a common prefix. This common prefix indicates that these branches may be compressed into a single branch. When a next branch is encountered, this compressed branch may become a compressed node. This is explained further hereinbelow.

Parsing continues down the 3 branches mentioned hereinabove. These branches are: branch 11 (pronounced 'branch one one') as shown in column 1 of FIG. 5A, from row 1 to row 2; branch 12 as shown in columns 2 and 3 of FIG. 5A from row 1 to row 2; branch 13 as shown in column 4 of FIG. 5A, from row 1 to row 2.

Branch 11 has only an undivided path to row 6 in column 1, and branch 13 has only an undivided path to row 6 in column 4. This indicates that branch 11 and branch 13 contain leaf nodes with node numbers 111230 and 131021, respectively, which may be child nodes of node 1.

Branch 12 has two paths, in columns 2 and 3 that share the same prefix in row 1 and row 2. This indicates that columns 2 and 3 are compressed between rows 1 and 2. As this compressed branch itself branches in row 3 into branches 121 and 122, this indicates that there is a compressed node 12, as shown in FIG. 5B.

Parsing down branch 121 (in column 2) and branch 122 (in column 3), reveals undivided paths to row 6, that indicate that the two child nodes of node 12 are both leaf nodes, with node numbers 121211 and 122102. Having parsed branch 1, next branch 0 may be parsed in a similar manner. The resultant dynamic hash tree 60 may have: a root node $RH_A$; 5 branch nodes: node 1, node 0, node 12, node 041 and node 0413; and, 8 leaves: node 111230, node 121211, node 122102, node 131021, node 031022, node 041101, node 041302 and node 041321, which are the 8 hash values in table 58.

Applicant has realized that leaf hash value parsing is simple to implement on associative memory arrays in associative processing units (APUs), and can be performed in relatively few memory cycles. Just as the RDBPC algorithm may start by parsing all columns simultaneously from row 1 down, searching across 8 leaf hashes for common prefixes, before moving down subtrees, it will be appreciated that the process is the same for hundreds or thousands of leaf hash values. An associative processing unit may operate in parallel on enormous numbers of (32k, 64k 128k . . . ) of leaf hash values stored in associative memory array columns, with no impact on processing time. Increasing the number of bytes in the hash will of course increase parsing time, but massive parallel processing capabilities of APUs allows for root hash value calculation performance that may be independent of the number of leaf hashes. It will be further appreciated that the on-the-fly compression discussed hereinbelow, may only improve processing times.

Merkle trees by comparison require additional mandatory node calculations with an increase in leaf hashes, as more mandatory branch nodes and tree levels are required.

Together, leaf hash value parsing and massively parallel processing implemented on an associative memory may provide orders of magnitude improvement in processing time and a significant reduction in computational complexity.

Associative Hash Tree Compression

Figure 2:
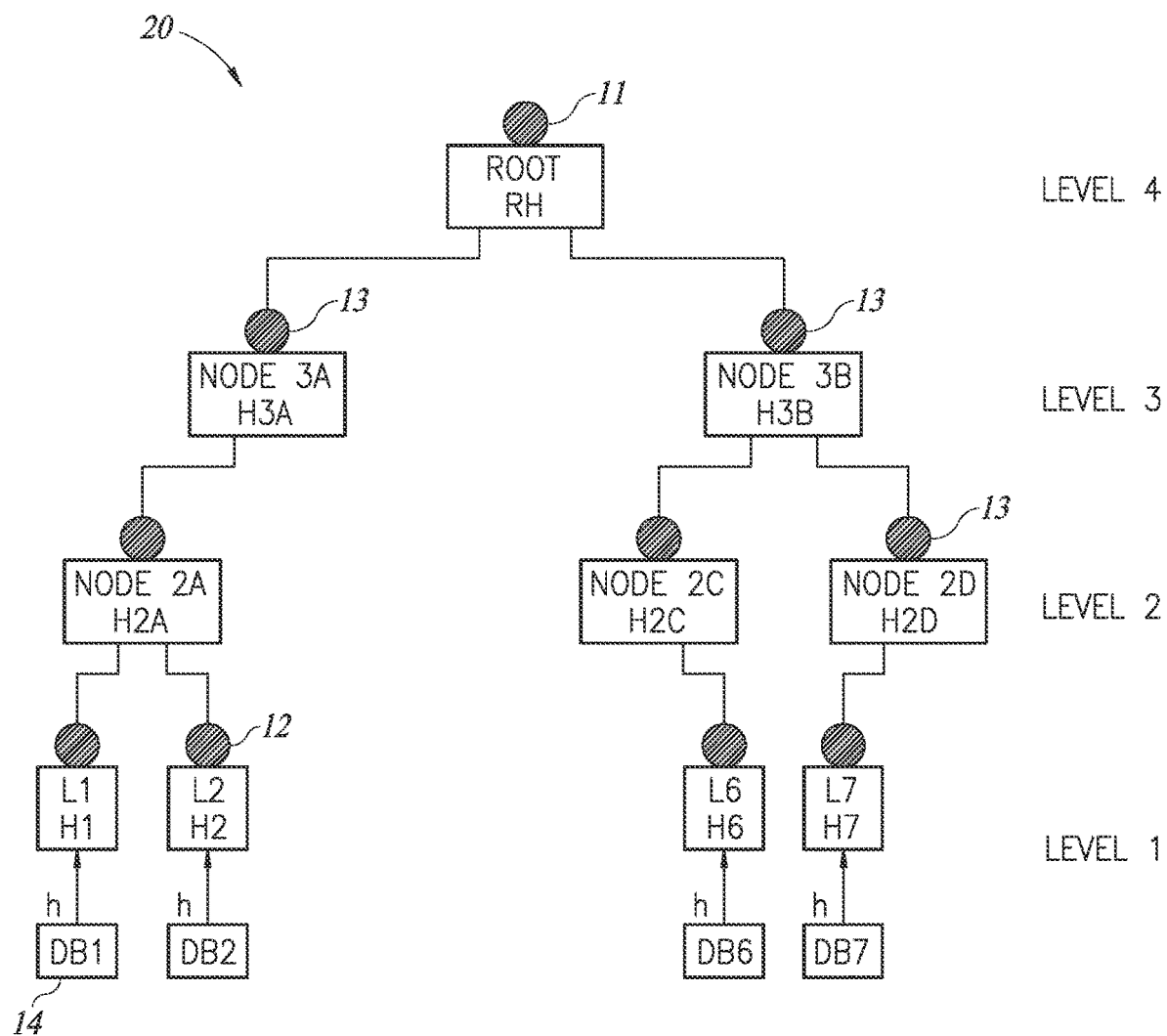
FIG. 2 is an illustration of a sparse Merkle tree.
Figure 3:
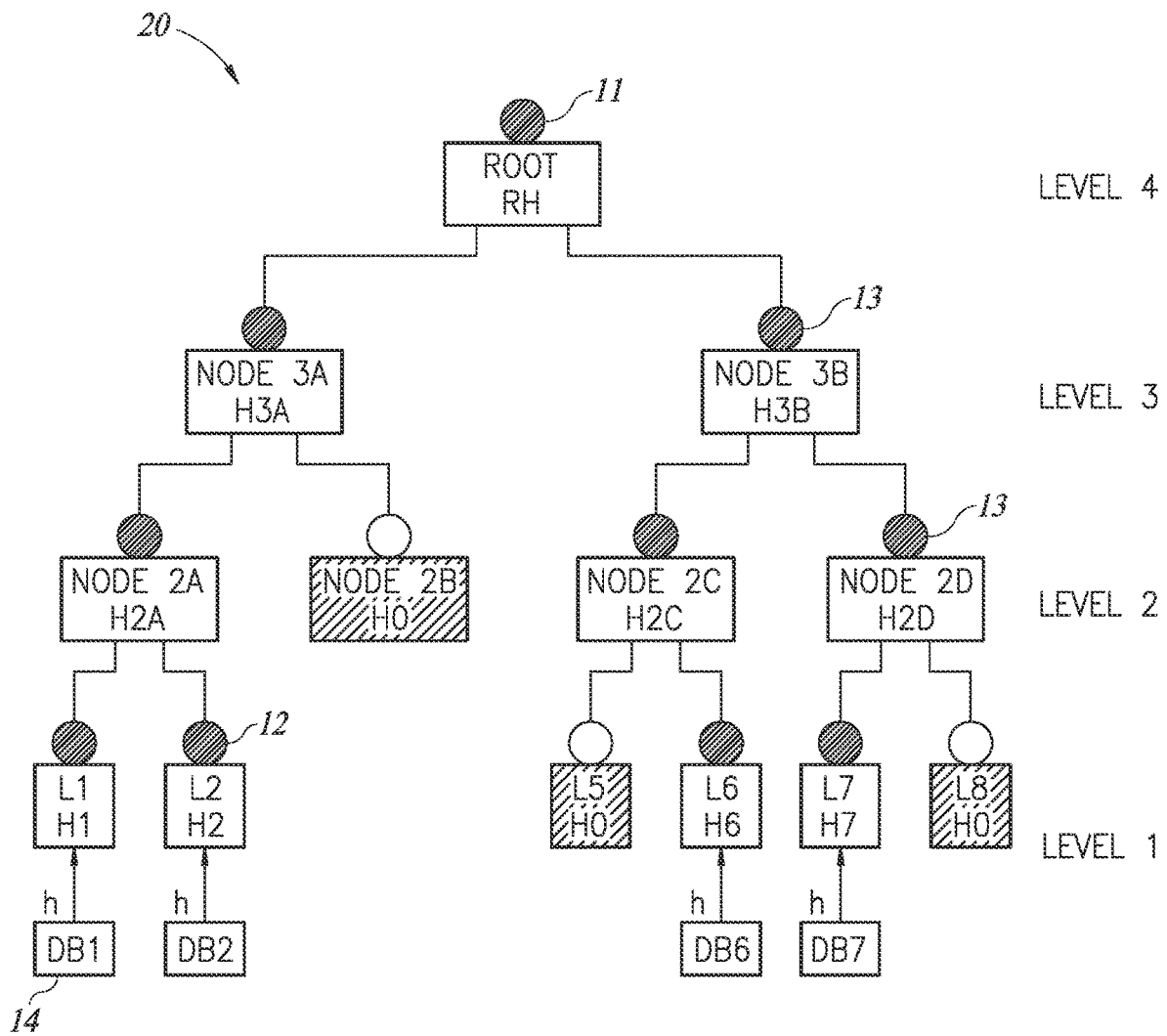
FIG. 3 is an illustration of the calculation of a root hash of the sparse Merkle tree of FIG. 2.
Figure 4:
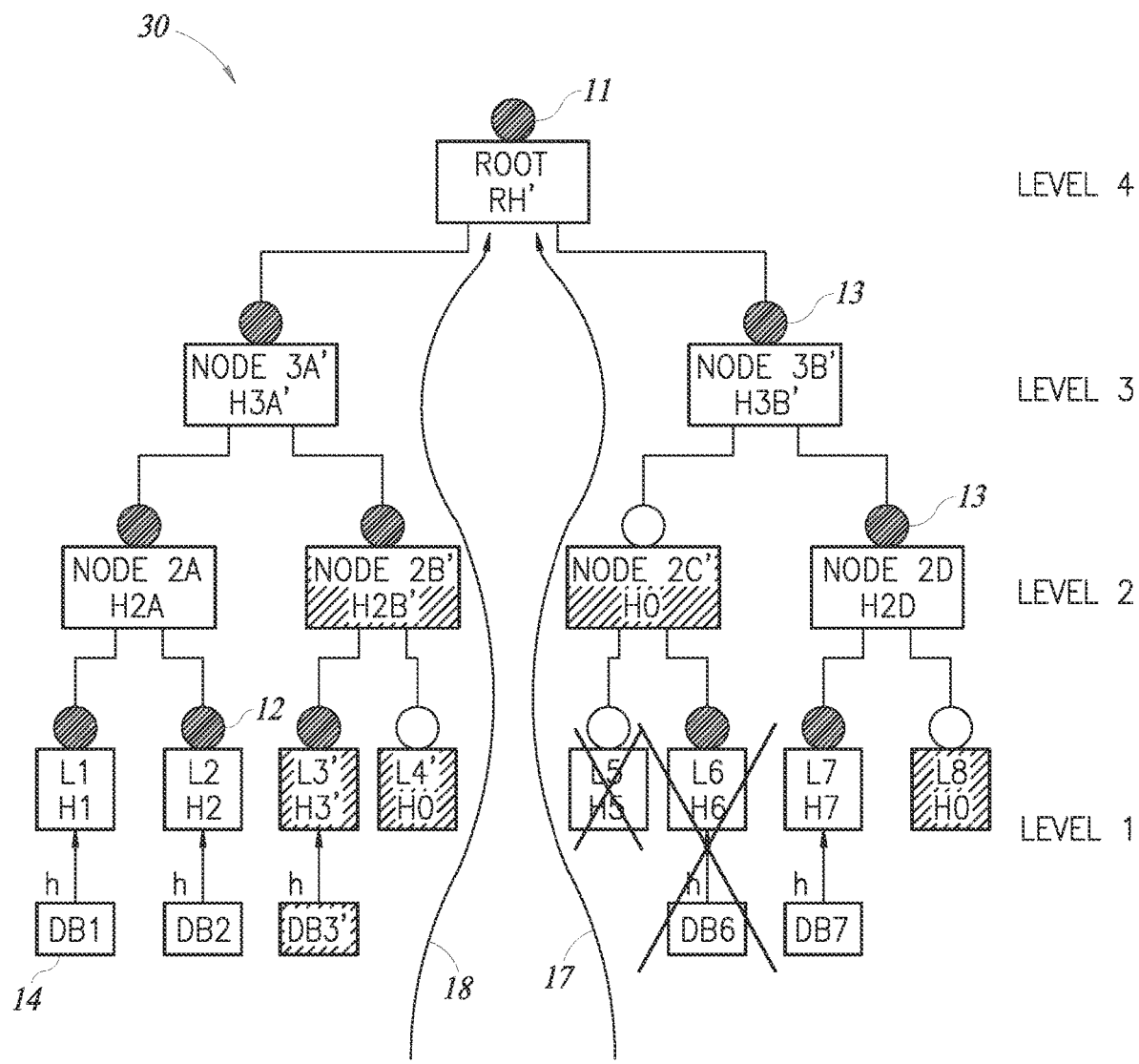
FIG. 4 is an illustration of the recalculation of a root hash of the sparse Merkle tree.

Simple incremental parsing may produce an uncompressed tree (such as Merkle tree 20 in FIG. 2), with a node representing every increment to N in the parsing process. Applicant has realized that a RDBPC algorithm may produce a compressed tree (such as associative hash tree 60 in FIG. 5B). This is because every incremental parse which does not encounter a branch in the longest common prefix may represent the compression of sequential nodes into a compressed node. Such compression may be reflected by node 12, node 041 and node 0413 in associative hash tree 60 in FIG. 5B. It will be appreciated that such on-the-fly compression may be carried out very efficiently by associative processor 54.

Finding the longest common leaf hash prefixes, as mentioned hereinabove, is the primary step of the parsing and compression algorithm. Step 1—select a set of columnar entries, which may have a common prefix of length N. Step 2—check if all entries in the set from step 1 have the same hash value at position (N+1). If not, there is a branch. Step 3A—if there is no branch, the set entries from step 1 have a common prefix of length N+1. Then increment N and go back to step 2. Step 3B—if there is a branch, then the prefix with length N may represent a branch node key. Step 4—record branch node key or root hash in memory. It will be appreciated that checking for branches may be carried out very efficiently by associative processor 54.

As mentioned hereinabove, parsing may produce an associative hash tree structure from the top down, but the calculation of the root hash requires calculation of node hashes from the bottom level leaf hashes to the root.

Applicant has realized that by compressing nodes that do not branch, then the number of calculations required to calculate RH may be reduced compared to hash trees implementations like Merkle trees that require calculations at every node.

Associative Hash Tree System

Applicant has realized that an on-the-fly, bottom to top root hash calculation, may be integrated into the RDBPC algorithm mentioned above.

Figure 6:
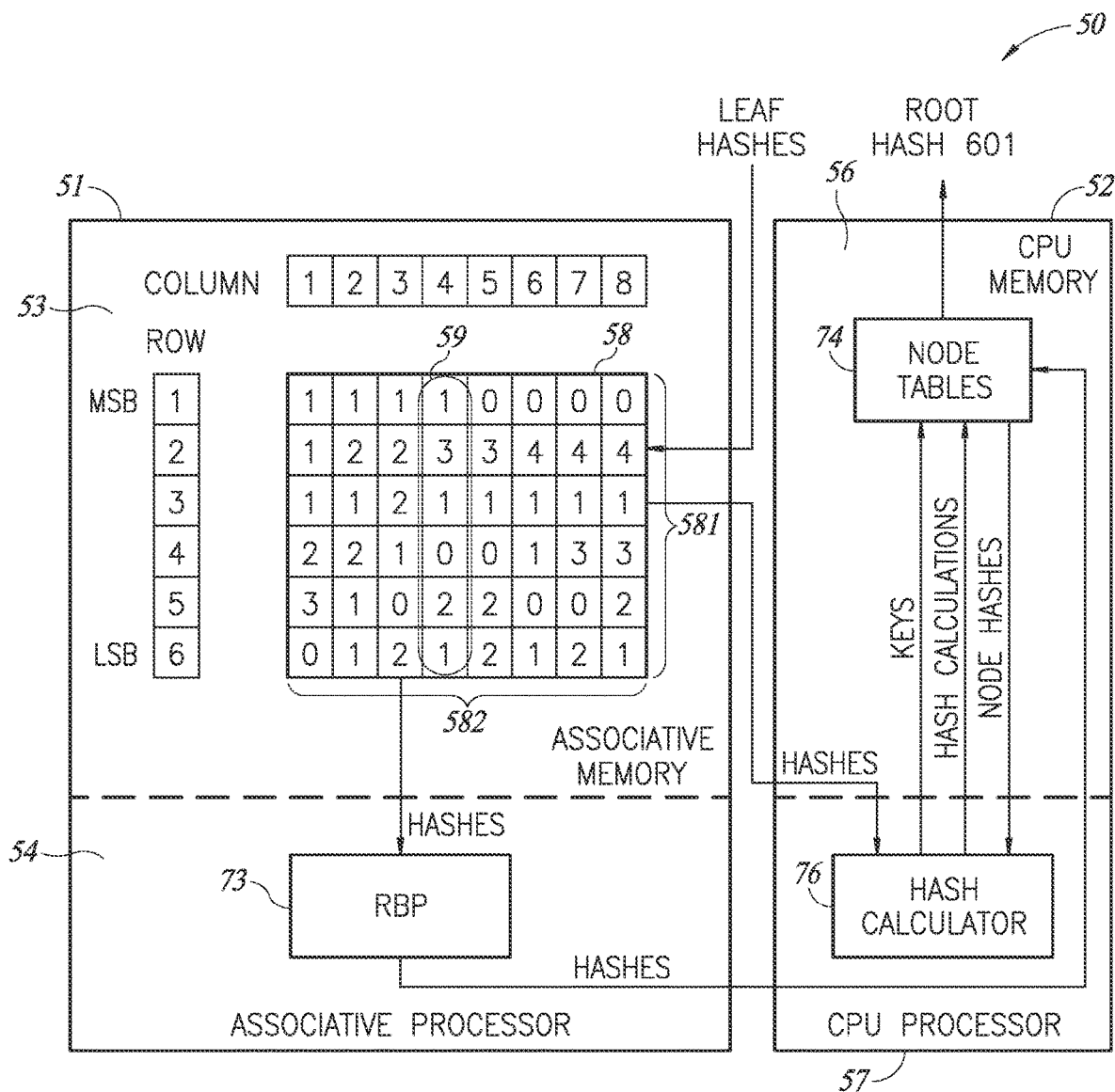
FIG. 6 is an illustration of an exemplary associative hash tree system.

Reference is made to FIG. 6 which illustrates associative hash tree system 50. In a preferred embodiment CPU processor 57 further comprises a hash calculator 76. Associative processor 54 further comprises a recursive back tracking parser (RBP) 73. CPU memory 56 further comprises node tables 74.

As explained hereinabove, children of branch nodes may be hashed together to produce the node value. When a node has siblings, a calculation is required between siblings to calculate the parent node value. In the exemplary associative hash tree 60 of FIG. 5B, a node may have up to 256 child nodes. To calculate root hash, $RH_A$, of node root (root being the node number or key of the root node) of dynamic hash tree 60 the following steps may be taken and the results written to node tables 74.

Node Tables

Reference is now made to FIG. 7, which illustrates node tables 74 comprising tables 7A through 7D. It should be noted that the number of tables in branch hash tables 74 may vary depending on the number of node levels in hash tree 60, and on the specific table implementation. It should be noted that node tables may be stored as a flat set of data values and not stored as a hierarchical memory structure, unlike those used to store tree, node and leaf data in a Merkle trees as described hereinabove. The hierarchical structure of an associative hash tree may not be stored, rather the structure may be recreated on-the-fly by parsing and reparsing leaf hash values.

It should also be noted that branch hash tables may be implemented as a single table, with different columns. Tables 7A-7D are organized according to the node depth of the branch nodes in the tables, as explained hereinbelow. Tables 7A-7D may comprise 3 columns: column 1 may contain the node number or key; column 2 may contain any child node numbers or keys; and, column 3 may contain the calculated node hash value. Optional additional columns may contain node depth and indexing information. It will be appreciated, that for clarity, column 3 of tables 7A-7D contains the equation for calculating the hash value, not the actual hash value.

Calculate Root Hash

In order to calculate $RH_A$, it may only be necessary to ensure that ordering of the hash values calculated by equation 2, as mentioned in the Background, is done in lexicographical order according to the node keys, which means that (a) branch nodes that have a child node with a higher node depth should be calculated first, and (b) that sibling nodes are also calculated in lexicographical order. As an example of (a), the calculation of the hash of node 0413, which has a node depth of 3, should precede the calculation of the hash of node 041, which has a node depth of 2. In the following example, the calculation of node 0413 should precede the calculation of node 041, and the calculation of node 041 should precede the calculation of node 0. Likewise, the calculation of node 12 should precede the calculation of node 1. As an example of (b), in the calculation of node 0413, the node 041302 should precede the node 041321. The calculation of node $RH_A$ may only occur when node 0 and node 1 have been calculated. For clarity, in the example, calculations may be performed on the tables in reverse node depth order, starting with table 7D, then table 7C, then table 7B and finally table 7A.

First—table 7D—Node depth 3.

Step 1—calculate node 0413: From table 7D (column 2), the child nodes of node 0413 are node 041302 and node 041321. The hash values of node 041302 and node 041321 are known; they are the same as the node numbers, so the hash of 0413 is the hashing of its two child leaf nodes 041302 and 041321, according to equation 2. The resulting hash value H(0413) may be stored in table 7D (column 3 lists the equation to produce H(0413)).

Second—table 7C—Node depth 2.

Step 2A—calculate node 12: Calculate similarly to 0413 in step 1A above using data from table 7C, and the resulting hash value may be stored in table 7C.

Step 2B—calculate node 041: From table 7C, the child nodes of node 041 are node 041101 and node 0413. The hash value of node 041101 is known, it is the same as the node number. The hash value of node 0413 was calculated in step 1A and stored in table 7D. So the hash of 041 is the hashing of its two child nodes, node 041101 and the hash value retrieved from table 7D. The resulting hash value may be stored in table 7C.

Third—Table 7B.—Node Depth 1

Step 3A—calculate node 1: Calculate similarly to 041 in step 2A above using data from table 7C, and the resulting hash value may be stored in table 7B.

Step 3B—calculate node 0: Calculate similarly to 041 in step 2A above using data from table 7C, and the resulting hash value may be stored in table 7B.

Finally—table 7A—Node depth 0 (Root Hash).

Step 4—calculate $RH_A$: From table 7A, the child nodes of node root are: node 0 and node 1. The hash values may be recalled from table 7B.

Referring back to FIG. 6, as mentioned hereinabove, leaf node hashes may be stored in hash value store 58 that may be implemented as a flat list in associative memory 53 and may be parsed using associate memory processor 54. Any application of a hash tree that requires calculation of hash values may be performed by CPU processor 57, and stored in and/or retrieved from node tables 74 that may be dedicated tables in CPU memory 56, as described hereinbelow. RBP 73 may identify branch nodes and children of branch nodes and may update node tables 74, as explained hereinabove. Hash calculator 76 may then calculate branch node hash values and subsequently $RH_A$ and then may add the results to node tables 74, as explained hereinabove.

It will be appreciated that, by implementing hash parser 73 on associative processor 51, the simultaneous parsing and compression of a large plurality of large multibyte hash values may be efficiently performed with massively parallel processing.

Once the root hash is calculated for standard hash trees, such as Merkle trees, the tree is stored as a tree structure of nodes and leaves and associated calculations. When there are changes to the leaf values, then all nodes require review and recalculation, if necessary.

Applicant has realized that, for dynamic hash trees, no actual hash tree structure may be stored. Only leaves and node calculations may be stored: leaves may be stored flat, as a 'bag of leaves,' in associative memory 53; node calculations may be stored in node tables 74.

Leaf Hash Updates

Applicant has realized that for associative hash tree 60, when a data block is added, edited or deleted, the tree structure may be derived anew by parsing the new leaf hashes, then node recalculations made as explained hereinabove, and any existing node calculations stored in memory that can be reused may be recalled from node tables 74.

Figures 8, 9:
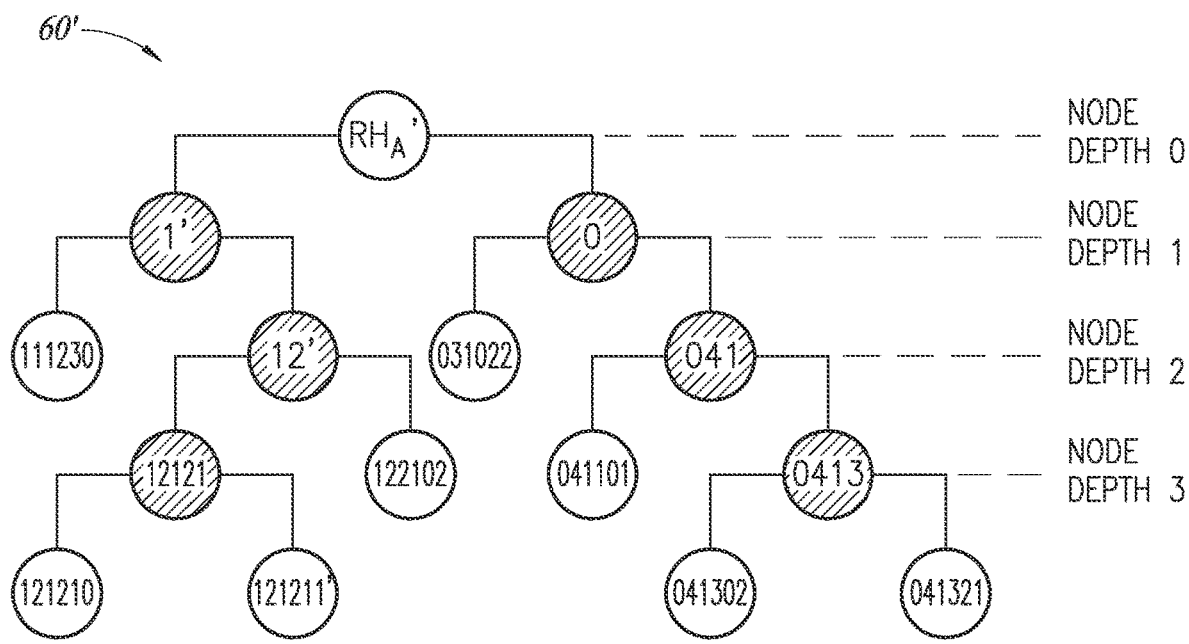
FIG. 8 is an illustration of an updated hash value store, constructed and operative according to a preferred embodiment of the present invention.
FIG. 9 is an illustration of a sparse associative hash tree derived from the hash values in FIG. 8.

Reference is made to FIG. 8 which illustrates hash value store 58', which contains the same data as hash store 58 with the addition of leaf hash value 121210 and leaf hash value 131021 to be deleted. Added and deleted hash values may be as a result of the addition of a data block to and the deletion of a data block from memory. It will be appreciated that an edit of a data block may cause leaf data 59 to be replaced with a new data block hash. Such an edit may be described as a delete and add in the same column, and hence is explained hereinbelow in the example of an addition and deletion of leaf hashes.

Parse Updated Leaf Hashes

Similar to the method described above, the RDBPC algorithm may parse the leaf values stored in hash table 58'. The resultant dynamic hash tree 60' may have: a root node; 6 branch nodes: node 1', node 12', node 12121, node 0, node 041 and node 0413; and, 8 leaves: node 111230, node 121210, node 121211', node 122102, node 031022, node 041101, node 041302 and node 041321, which are the 8 remaining hash values in FIG. 8. Reference is briefly made to FIG. 9 which illustrates updated associative hash tree 60'.

Update Node Tables

The next step is to update node tables 74' which will be used to recalculate root hash value $RH_A'$ of hash tree 60'. Reference is now made to FIG. 10 which illustrates updates to branch node table 74' using tables 7A', 7B', 7C' and 7D'. When leaf hash value 131021 is to be deleted and leaf hash value 121210 is added to hash store 58', the following updates may be made to node tables 74' (for clarity, new, updated and moved table entries have been underlined thusly xxxx and deleted entries have been crossed through thusly ~~xxxx~~ ):

(i) Hash value 131021 may be removed as a child from node 1' in table 7B' (as indicated by the value being crossed through). (ii) Node 121211 may be removed as a child of node 12' in table 7C'. (iii) New branch node 12121 may be added as a child node of node 12' in table 7C' (as indicated by the value being underlined). (iv) New branch node 12121 may be added as a node itself to table 7D'. (v) Node 121211 may be added as a child of node 12121 in table 7D'. (vi) New leaf node hash 121210 may be added as a child node of node 12121 in table 7D'.

Hash tables 74' may now reflect the branch nodes and child nodes as a result of parsing new hash values in hash value store 58', as shown hereinabove.

Recalculate Root Hash

Next, $RH_A'$ may be recalculated, using a similar method as described hereinabove:

First—table 7D'—Node depth 3.

Step 1A—calculate node 0413: This node and its children are unchanged so the value that was calculated previously for tree 60 may still be valid and may be recalled from table 7D'.

Step 1B—calculate node 12121: Calculate as a hash of leaf hash values 121210 and 121211, according to equation 2, and the resulting hash value may be stored in table 7D'.

Second—table 7C'— Node depth 2.

Step 2A—calculate node 012: The hash value of node 122102 is known, and the hash value of node 12121 was calculated in step 1B and may be recalled from table 7D'. The resulting hash value may be stored in table 7C'.

Step 2B—calculate node 041: This node and its children were unchanged so the value that was calculated previously for tree 60 may still be valid and may be recalled from table 7C'.

Third—Table 7B'— Node depth 1.

Step 3A—calculate node 1: Calculate similarly to 012 in step 2A above using data from table 7C', resulting hash value may be stored in table 7B'.

Step 3B—calculate node 0: Calculate similarly to 012 in step 2A above using data from table 7C', and the resulting hash value may be stored in table 7B'.

Finally—Table 7A'—Node depth 0.

Step 3—calculate $RH_A'$: Calculate similarly to 012 above in step 2A using data from table 7B', and the resulting hash value may be stored in table 7A'.

Reviewing FIG. 10 shows that 7 hash calculations are required for the calculation of $RH_A'$. However, it will be appreciated that node 0, node 041, and node 0413 did not require recalculation as their hash values remained unchanged from the previous calculations of $RH_A$. So in this case, the recalculation of $RH_A'$ may only require 4 subsequent calculations. It will be appreciated that this may be far fewer recalculations than required for a regular Merkle tree. It will be appreciated that the number of recalculations required to recalculate root hashes for more complex associative hash trees may be a far lower proportion of total hash tree calculations, than in a simple case illustrated hereinabove.

Attention is briefly drawn back to FIG. 6. When leaf values are added or deleted from hash table 58', RBP 73 may reparse table 58' to produce a new associative hash tree 60'. RBP 73 may update branch node tables 74 with new branch node, child node and leaf node designations. Hash calculator 76 may recalculate root hash $RH_A'$ and any other required branch nodes as explained hereinabove.

It will be appreciated that the present invention may reduce the number of calculations required to calculate the root hash of an associative hash tree. The abovementioned method of calculating sparse hash trees means that root hashes may be calculated and recalculated, with a reduced number of calculation steps compared to Merkle trees.

It will be appreciated that to dynamically calculate a root hash value from a set of leaf hash values, may only require extracting branch nodes, and determining branch node relationships from such leaf hash values stored in an associative memory. These branch node relationships, and branch nodes may be stored in node tables. Then the hash value of the branch nodes may be calculated from these branch node hash values and the leaf node hash values, according to the branch node relationships. The root hash value may be calculated from the branch node hash values. It will be further appreciated that at no point is a hierarchical structure of a hash tree stored. Nodes, node relationships and calculated node hash values may be stored in a flat memory table or set of tables, but they are merely referenced as required, and not attached to a hierarchy such as in a Merkle tree. If a leaf hash value changes, then new extracting, determining and calculating may take place, towards a new root hash value. Where stored calculations may be reused, they may be recalled from node tables and any updated results written back. However, at no point is a tree structure stored or utilized towards calculating the root hash value.

The embodiments described hereinabove may be implemented on any suitable computing device.

Unless specifically stated otherwise, as apparent from the preceding discussions, it is appreciated that, throughout the specification, discussions utilizing terms such as "processing," "computing," "calculating," "determining," or the like, may refer to the action and/or processes of a general purpose computer of any type, such as a client/server system, mobile computing devices, smart appliances, cloud computing units or similar electronic computing devices that manipulate and/or transform data within the computing system's registers and/or memories into other data within the computing system's memories, registers or other such information storage, transmission or display devices.

Embodiments of the present invention may include apparatus for performing the operations herein. This apparatus may be specially constructed for the desired purposes, or it may comprise a computing device or system typically having at least one processor and at least one memory, selectively activated or reconfigured by a computer program stored in the computer. The resultant apparatus when instructed by software may turn the general-purpose computer into inventive elements as discussed herein. The instructions may define the inventive device in operation with the computer platform for which it is desired. Such a computer program may be stored in a computer readable storage medium, such as, but not limited to, any type of disk, including optical disks, magnetic-optical disks, read-only memories (ROMs), volatile and -volatile memories, random access memories (RAMs), electrically programmable read-only memories (EPROMs), electrically erasable and programmable read only memories (EEPROMs), magnetic or optical cards, Flash memory, disk-on-key or any other type of media suitable for storing electronic instructions and capable of being coupled to a computer system bus. The computer readable storage medium may also be implemented in cloud storage.

Some general-purpose computers may comprise at least one communication element to enable communication with a data network and/or a mobile communications network.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A system to dynamically calculate a root hash value from a plurality of leaf hash values, the system comprising:
   a flat associative memory to store said plurality of leaf hash values; and
   a hash parser to extract a compressed number of branch nodes from said plurality of leaf hash values, to determine branch node relationships from said plurality of leaf hash values, and to save said compressed number of branch nodes, and said branch node relationships.

2. The system of claim 1 wherein said plurality of leaf hash values is stored in columns of said flat associative memory.

3. The system of claim 1 wherein said hash parser to extract said compressed number of branch nodes, and said branch node relationships are determined from a top root node down to a set of leaves.

4. The system of claim 1 wherein said hash parser to parse said plurality of leaf hash values from a most significant byte to a least significant byte of said plurality of leaf hash values.

5. The system of claim 1 wherein said hash parser to find common prefixes between said plurality of leaf hash values.

6. The system of claim 1 and also comprising a node calculator to calculate branch node hash values, and said root hash value according to said branch node relationships.

7. The system of claim 6 and also comprising at least one flat node table to save said compressed number of branch nodes, and said branch node relationships.

8. The system of claim 7 wherein said at least one flat node table to record said branch node hash values, and said root hash value.

9. The system of claim 8 wherein said node calculator to recalculate a new root hash value using at least one newly calculated branch node hash value and said branch node hash values stored in said at least one flat node table.

10. The system of claim 1 wherein said hash parser is implemented in an associative processing unit.

11. The system of claim 8 wherein said at least one flat node table is implemented in CPU memory.

12. The system of claim 6 wherein said node calculator is implemented on a CPU.

13. A method to dynamically calculate a root hash value from a plurality of leaf hash values, the method comprising:
    storing said plurality of leaf hash values in a flat associative memory;
    extracting a compressed number of branch nodes from said plurality of leaf hash values;
    determining branch node relationships from said plurality of leaf hash values; and
    saving said compressed number of branch nodes, and said branch node relationships.

14. The method of claim 13 wherein said storing comprises storing said plurality of leaf hash values in columns of said flat associative memory.

15. The method of claim 13 wherein said extracting and said determining comprise extracting and determining from a top root node down to a set of leaves.

16. The method of claim 13 wherein said extracting comprises extracting from a most significant byte to a least significant byte of said plurality of leaf hash values.

17. The method of claim 13 wherein said extracting comprises finding common prefixes between said plurality of leaf hash values.

18. The method of claim 13 and also comprising calculating branch node hash values, and said root hash value according to said branch node relationships.

19. The method of claim 18 wherein said saving comprises saving to at least one flat node table.

20. The method of claim 19 and also comprising recording said branch node hash values, and said root hash value to said at least one flat node table.

21. The method of claim 20 and also comprising recalculating a new root hash value using at least one newly calculated branch node hash value and said branch node hash values stored in said at least one flat node table.

* * * * *